G. T. SMITH.
BOLTING MACHINE.
APPLICATION FILED DEC. 31, 1909.
984,041.
Patented Feb. 14, 1911.
3 SHEETS—SHEET 3.
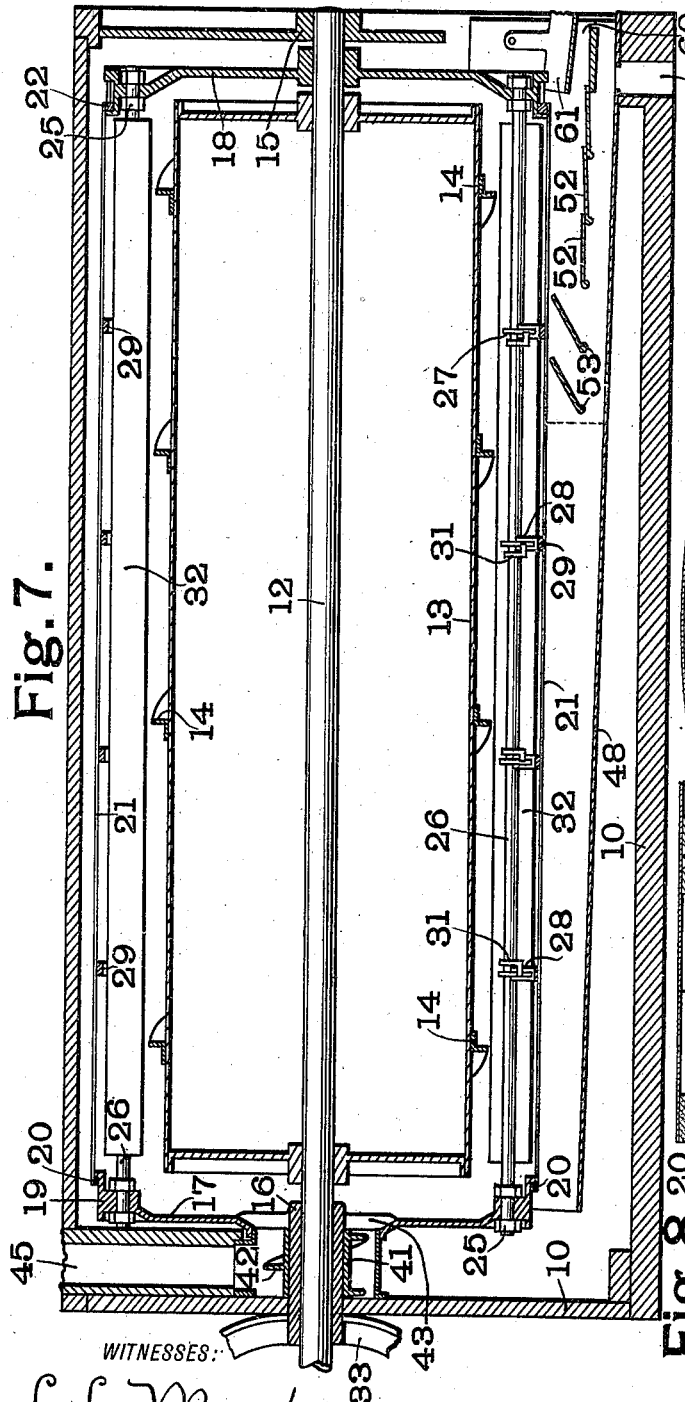
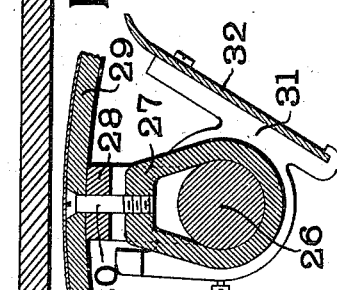
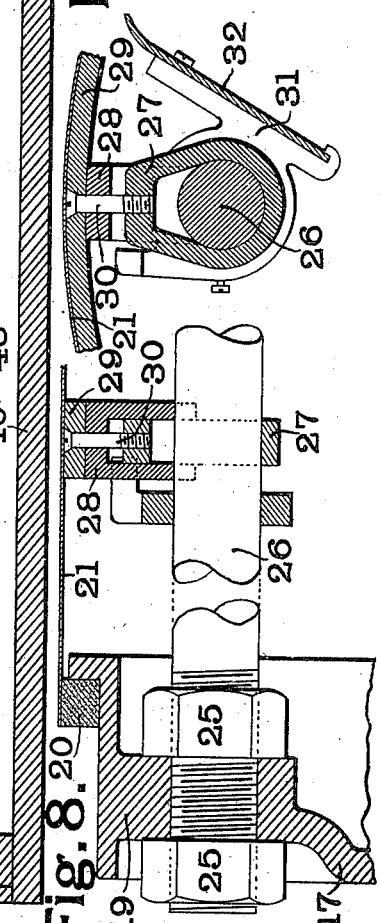
WITNESSES:
L. L. Mead.
W. A. Alexander
INVENTOR
George T. Smith
BY
Fowler & Huffman
ATTORNEYS

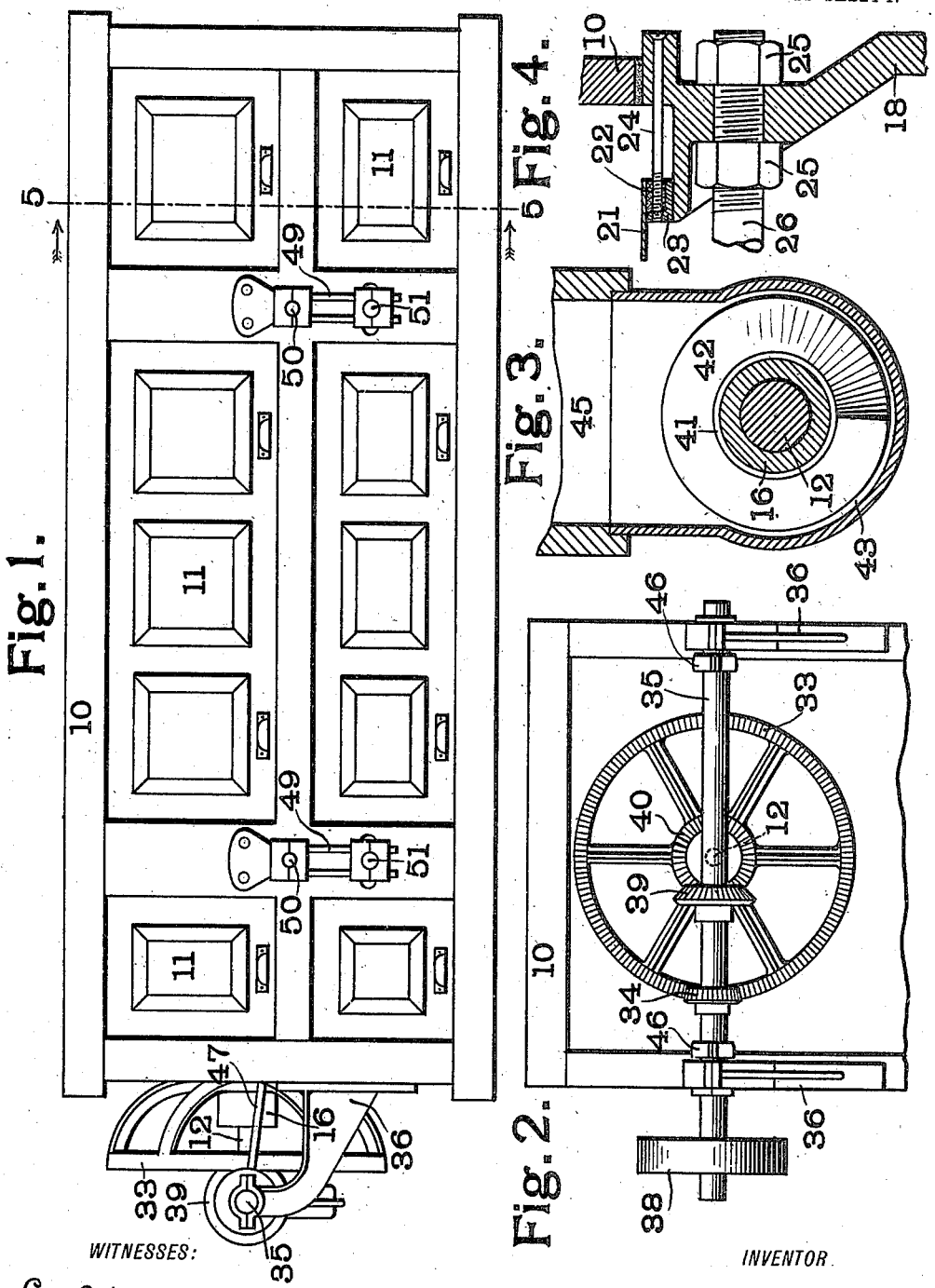

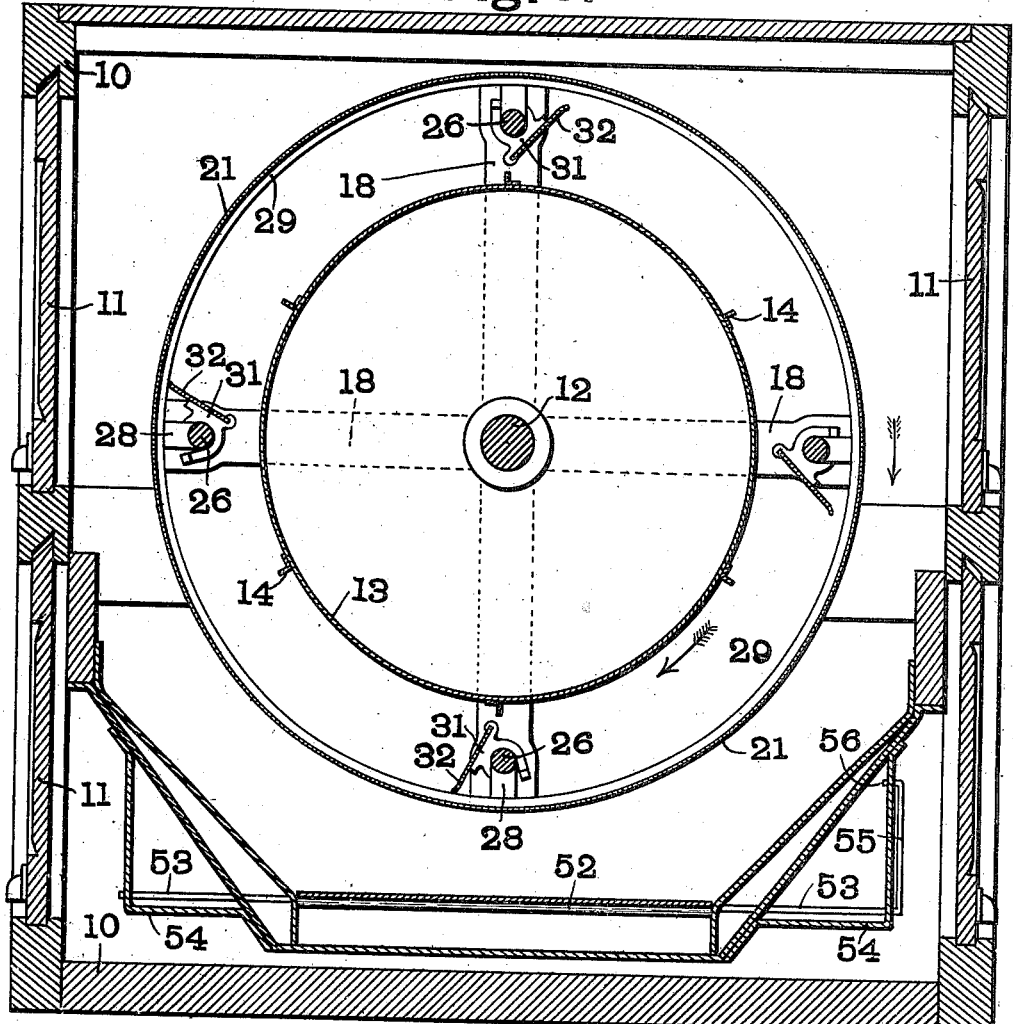
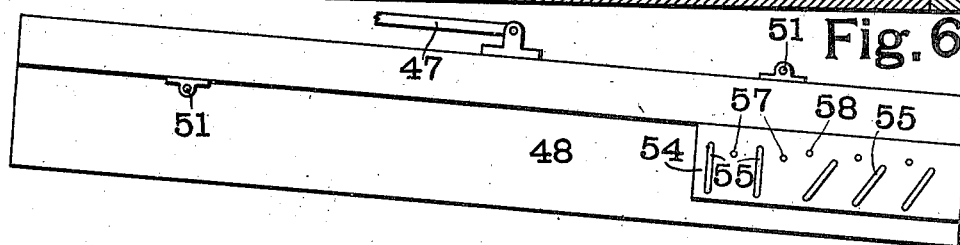

UNITED STATES PATENT OFFICE.

GEORGE T. SMITH, OF ST. LOUIS, MISSOURI, ASSIGNOR, BY MESNE ASSIGNMENTS, TO GEORGE T. SMITH PURIFYING COMPANY, OF ST. LOUIS, MISSOURI, A CORPORATION OF MISSOURI.

BOLTING-MACHINE.

984,041.

Specification of Letters Patent. Patented Feb. 14, 1911.

Application filed December 31, 1909. Serial No. 535,874.

*To all whom it may concern:*

Be it known that I, GEORGE T. SMITH, a citizen of the United States, residing at St. Louis, Missouri, have invented a certain new and useful Bolting-Machine, of which the following is such a full, clear, and exact description as will enable any one skilled in the art to which it appertains to make and use the same, reference being had to the accompanying drawings, forming part of this specification.

My invention relates to a bolting machine and has for its object the improvement of the details of construction of such machine, and also the provision of an improved form of conveyer which will not only convey the material passing through the cloth of the machine but which will also separate the product into different grades of material.

In the accompanying drawings which illustrate one form of machine made in accordance with my invention, Figure 1 is a side elevation; Fig. 2 is an end view; Figs. 3 and 4 are enlarged sectional views showing details of construction; Fig. 5 is an enlarged section on the line 5—5 of Fig. 1; Fig. 6 is a side elevation of the conveyer; Fig. 7 is a longitudinal vertical section and Figs. 8 and 9 are enlarged sectional views showing details of construction.

Like marks of reference refer to similar parts in the several views in the drawings.

10 represents the casing of the machine. The sides of the casing 10 are preferably provided with removable doors 11 to give access to the interior of the machine for inspection, cleaning, etc. Passing longitudinally through the casing 10 is a shaft 12 upon which is mounted a cylinder 13 preferably formed of sheet metal. Carried on the cylinder 13 are the distributing blades 14 preferably spirally arranged around the said cylinder. The shaft 12 is mounted at one end of the machine in a bearing 15 and at the other in a sleeve 16 carrying a hood 17. This hood 17 forms one end of a cylindrical frame carrying the bolting cloth. The opposite end of the cylindrical frame is formed by a spider 18 also loosely mounted upon the shaft 12. The disk 17 carries a rim 19, shown in detail in Fig. 8. On this rim is mounted an annular member 20 to which is fastened one end of the bolting cloth 21. The other end of the bolting cloth 21 is secured to a ring 22 of leather or other suitable material carried on the spider 18 and shown in detail in Fig. 4. This ring 22 is carried by a flanged annular member 23. The member 23 is situated around the outside of the spider 18, as shown in Fig. 4, and fits upon the spider loosely so that it may be moved longitudinally. This ring may be moved by means of screws 24 so as to tighten the bolting cloth 21. Secured to the disk 17 and spider 18 by means of nuts 25 are rods 26 preferably four in number, as shown in Fig. 5. Secured to the rods 26 are a number of yokes 27, shown in detail in Figs. 8 and 9. These yokes 27 coöperate with blocks 28 to support hoops 29 which support the central portions of the bolting cloth 21. Screws 30 pass through the hoops 29 and blocks 28 into the yokes 27. Loosely mounted on the rods 26 are a number of brackets 31 carrying elevator blades 32. As will be seen from inspection of Fig. 5 these elevator blades will fall into position close to the hoops when they reach the lower part of the drum and will thus carry the material upward and deliver it to the periphery of the drum 13 so it may be thrown against the bolting cloth by means of the distributing blades 14.

The hub 16, heretofore referred to, extends to the outside of the casing and has rigidly secured to it a beveled gear-wheel 33. This beveled gear-wheel 33 meshes with a beveled gear-wheel 34 on a shaft 35 carried in brackets 36 on the end of the casing 10. The shaft 35 is provided with a pulley 38 by means of which the said shaft is driven. The said shaft 35 also carries a beveled gear-wheel 39 meshing with a beveled gear-wheel 40 rigidly secured to the end of the shaft 12. Owing to the relative size and position of these various gear-wheels it will be evident that the cylinder 13 and the frame carrying the bolting cloth 21 will both be rotated in the same direction but the cylinder will be rotated very much more rapidly than the outer frame-work so that the distributing blades 14 will act to throw the material forcibly against the bolting cloth 21. Surrounding the hub 16 is a second hub 41 upon which is formed a worm 42. This worm 42 acts to feed the material through a central opening 43 in the disk or hood 17. The material is fed to the worm 42 through a vertical opening 45.

The shaft 35 in addition to the beveled gear-wheels 34 and 39, is provided with a pair of eccentrics 46 from which extend rods 47 attached to the center of a reciprocating trough 48. This trough 48 is suspended by means of links 49, shown in Fig. 1, so as to allow of its reciprocating movement. The links 49 are pivoted at their upper ends to pins 50 and at their lower ends to bearings 51 of the trough 48. The trough 48 is slightly inclined, as shown in Figs. 6 and 7, so that as it is reciprocated the material will pass along it and be delivered from the rear end of the machine. At the rear end of the trough 48 is provided, a partition formed of movable blades 52. These blades 52 are carried on rods 53 arranged in bearings 54. One end of each of the rods 52 is provided with an arm 55 at right angles to the main part of the rod. This arm 55 is provided with a detent 56 adapted to engage with holes 57 and 58 respectively, in one of the bearings 54. When the detents 56 are in engagement with the openings 57 the various blades 52 will be in the position shown at the right hand end of Fig. 7, so as to form an effective partition to separate the material falling thereon from the material falling in the trough 48 near the front end of the machine. When, however, the detents 56 are placed in the holes 58, the blades 52 are inclined as indicated by the two left hand blades in Fig. 7, so that they do not form an effective partition but the material falling thereon is guided down into the bottom of the trough. Thus by varying the position of the arms 55 the effective length of the partition in the trough may be varied and the separation of the material thus regulated. The material falling into the bottom of the trough 48 passes down through an opening 59. That falling on the blades 52 which are in operative position passes out through an opening 60 and the material which fails to pass through the bolting cloth 21 passes out through the rear end of the frame-work and falls on to a sheet 61 leading to any suitable receptacle.

From the above description the operation of my machine will be clear. The material to be bolted is fed into the machine through the vertical passage 45. The worm 42 insures the feeding of the material through the central opening 43 in the disk 17 so that the material is delivered between the outer cylindrical frame-work carrying the bolting cloth and the inner cylinder. As the outer cylindrical frame-work revolves, all the material which does not immediately pass through the bolting cloth is carried upward by the elevating blades 32 and delivered on to the inner cylinder 13. As this cylinder revolves with comparative rapidity the distributing blades 14 will throw the material forcibly against the bolting cloth 21. This operation is repeated until all the material which is of sufficient fineness has passed through the bolting cloth. The material which is too coarse to pass through the cloth will be delivered through the open end of the outer cylinder into the sheet 61. The part of the material which passes through the bolting cloth near the front end will be of greater fineness than that passing through at the latter part of the cylinder and by means of the partition formed on the blades 52 the material is separated, and by regulating the effective length of the partition this separation can be regulated so as to secure the desired consistency of the products.

Having fully described my invention, what I claim as new and desire to secure by Letters Patent of the United States, is:

1. In a bolting machine, the combination with a sifter, of a reciprocating inclined trough arranged below said shifter and acting as a conveyer for the material passing through said sifter, a plurality of pivoted blades forming a partition in said trough, means for moving said blades into and out of operating position, and gearing for actuating said sifter and reciprocating said trough.

2. In a bolting machine, the combination with a sifter, of a reciprocating inclined trough arranged below said sifter and acting as a conveyer for the material passing through said sifter, said trough being provided with openings, a plurality of pivoted blades forming a partition in said trough, said blades carrying arms with turned over ends adapted to engage in the openings in the trough to hold the blades in or out of operative position, and gearing for actuating said sifter and reciprocating said trough.

In testimony whereof, I have hereunto set my hand and affixed my seal in the presence of the two subscribing witnesses.

GEORGE T. SMITH. [L. S.]

Witnesses:
W. A. ALEXANDER,
ELIZABETH BAILEY.